United States Patent [19]

Grimpe

[11] 4,235,082
[45] * Nov. 25, 1980

[54] DETACHABLE OVERLOAD CONTROL COUPLING BETWEEN ROTATING MACHINE ELEMENTS

[75] Inventor: Karl Grimpe, Mülheim, Fed. Rep. of Germany

[73] Assignee: DEMAG, Aktiengesellschaft, Duisburg, Fed. Rep. of Germany

[*] Notice: The portion of the term of this patent subsequent to Aug. 24, 1993, has been disclaimed.

[21] Appl. No.: 936,495

[22] Filed: Aug. 24, 1978

[30] Foreign Application Priority Data

Oct. 1, 1977 [DE] Fed. Rep. of Germany ....... 2745489

[51] Int. Cl.³ .............................................. F16D 3/56
[52] U.S. Cl. .................................................. 64/28 R
[58] Field of Search .................................. 64/28 R, 6

[56] References Cited

U.S. PATENT DOCUMENTS

| | | | |
|---|---|---|---|
| 2,680,359 | 6/1954 | Bowers | 64/28 R |
| 2,969,661 | 1/1961 | Swanson | 64/28 R |
| 3,973,412 | 8/1976 | Miles | 64/28 R |
| 3,975,923 | 8/1976 | Grimpe | 64/28 R |
| 4,102,153 | 1/1978 | Steven | 64/28 R |

FOREIGN PATENT DOCUMENTS

| | | | |
|---|---|---|---|
| 500901 | 6/1930 | Fed. Rep. of Germany | 64/28 R |
| 914667 | 1/1963 | United Kingdom | 64/28 R |

*Primary Examiner*—Charles J. Myhre
*Assistant Examiner*—Magdalen Moy
*Attorney, Agent, or Firm*—Mandeville and Schweitzer

[57] ABSTRACT

A safety coupling is provided for joining rotating machine parts, in which those portions of the coupling involving wear and which are subject to relative movement between the two joined parts are formed as detachable portions inserted into recesses in the joined parts. With this arrangement, the detachable parts may be removed for repair and/or replacement without involving the handling of the coupled rotating parts themselves, the latter of which may be large and unwieldy.

4 Claims, 3 Drawing Figures

DETACHABLE OVERLOAD CONTROL COUPLING BETWEEN ROTATING MACHINE ELEMENTS

BACKGROUND AND STATEMENT OF THE INVENTION

This invention refers to an overload control device between two joined together rotating machine parts. There are at least two essentially semi-cylindrical projections radially extending from the machine parts, and uniformly distributed over the circumference. Two projections, with one each from a different machine part form cylinders, with a divider line or partition line parallel with the path of rotation of the machine parts. Each two projections are embraced by hollow cylindrical carrier links made of high-duty stiff material under initial stress, while stripper cams are arranged between the projections.

This invention is related to the invention disclosed in U.S. Pat. No. 3,975,923, issued Aug. 24, 1976, which is hereby incorporated by reference in its entirety. U.S. Pat. No. 3,975,923 suggests an overload control, particularly between the driving and the driven part of a shaft, with the overload point is safely predetermined with the least possible tolerance, and where damages to the clutch parts by broken carrier links are safely eliminated. The carrier links according to the invention may be exchanged within a very brief period of time, in case of breakage, and furthermore the condition of the carrier links may be easily checked during maintenance work.

As is the case with any machine part, this clutch, too, may show wear in certain cases after prolonged operation. Standard clutches of smaller sizes can then be disassembled during regular maintenance work in order to re-finish the semi-cylindrical projections. After assembly, the projections are connected by new carrier links. Quite often, however, there is not sufficient room to dismantle the machine parts without extensive disassembly, particularly when the overload control was subsequently added to existing installations by retrofitting. Furthermore, the finishing of semi-cylindrical projections evolved from large structural parts can be rather involved and expensive in overload controls of large dimensions.

Based on the foregoing, the present invention aims to extend the advantages of the overload control proposed by U.S. Pat. No. 3,975,923 to assembly and finishing of the machine parts, in order to obtain a more economical application of the overload control. This is achieved by arranging the projections and, if possible, at least part of the stripper cams on the machine parts in a detachable fashion. After wear, which occurs, for example, after long operating periods or because of faulty maintenance, in the semi-cylindrical projections, only the projections or at least only a small part of the entire structural part of the clutch need be removed and re-finished or exchanged.

It is a feature of the invention that the semi-cylindrical projections are components of a plate with a larger base surface and smaller lateral surfaces, and the level partition mating surfaces of each projection, parallel with the sense of rotation of the machine parts, are roughly on a level with one lateral surface of the plate. The plate with semi-cylindrical projection attached to the machine part is easily finished, once detached from the machine part. For built-in clutches it is not necessary to disassemble the main structural parts. Exchange of the projections is done easily and quickly. Preferably, the plates with their projections are connected to their respective machine part in a form-fitting manner to transmit the active forces to the machine part. This can, for example, be accomplished by flanging or grooving, whereby it is also possible to provide adjustable intermediate links as adapters. Also, the plates with their projections are fitted into recesses in the machine parts and fixed by detachable machine elements. In this way, the projections are very securely attached to the machine parts, and the active forces are absolutely safely transmitted from one shaft part to another via the semi-cylindrical projections with their carrier links.

Another detail of the invention is to attach the plates with their projections to the machine parts by gluing. Gluing can be used as an added safety measure to the detachable machine elements. It is, however, also feasible to use only glue to hold the plates in the recesses of the machine parts. The type of glue must be selected so that the connection can be easily removed if desired. The plates, according to the invention, must be designed so that each plate accommodates arresting elements to secure the carrier link. This is to ensure that in case of deformation of the rings due to overload, the functioning of the clutch just before the shut-off point is maintained until the precaution of exchanging the rings may be taken.

An example of the invention is shown on the drawings:

DETAILED DESCRIPTION OF THE INVENTION

Figure 1:
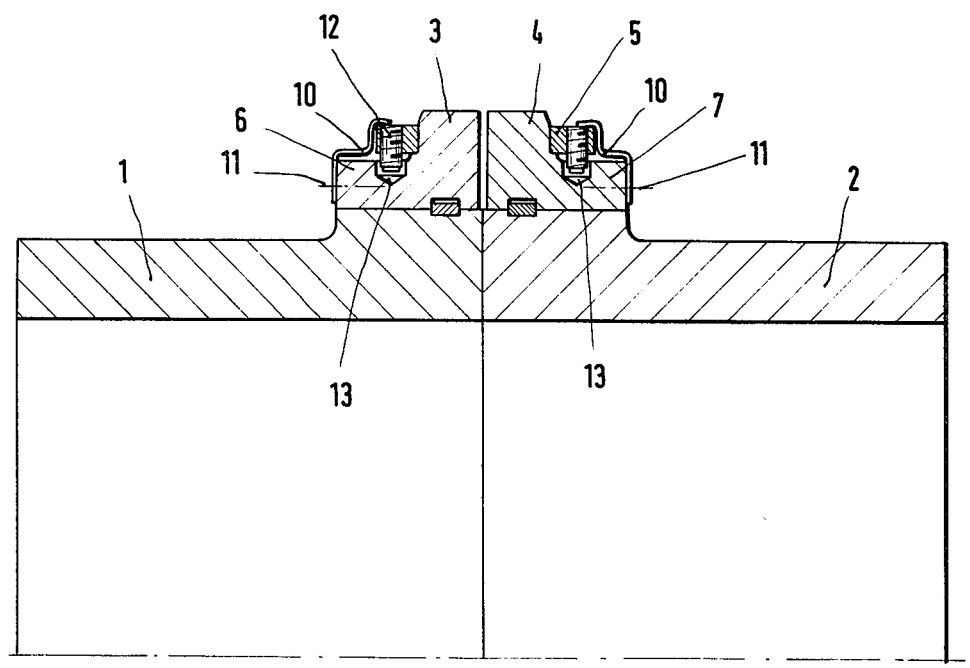
FIG. 1 is a cross sectional view of a portion of two joined rotating parts in the area of the overload control of the invention, and showing the opposed projections of the joined rotating parts.
Figure 2:
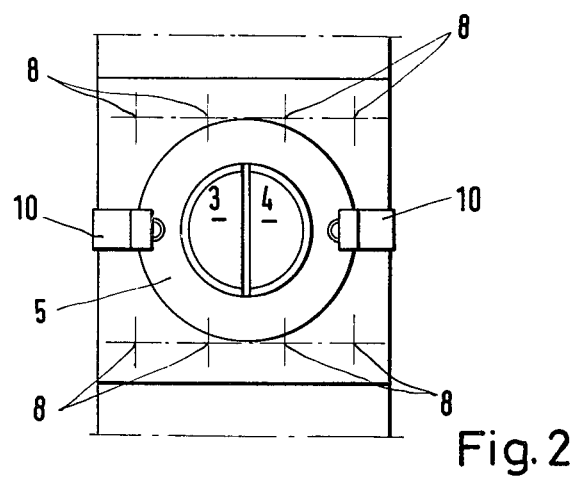
FIG. 2 is a top plan view of the overload control of FIG. 1.
Figure 3:
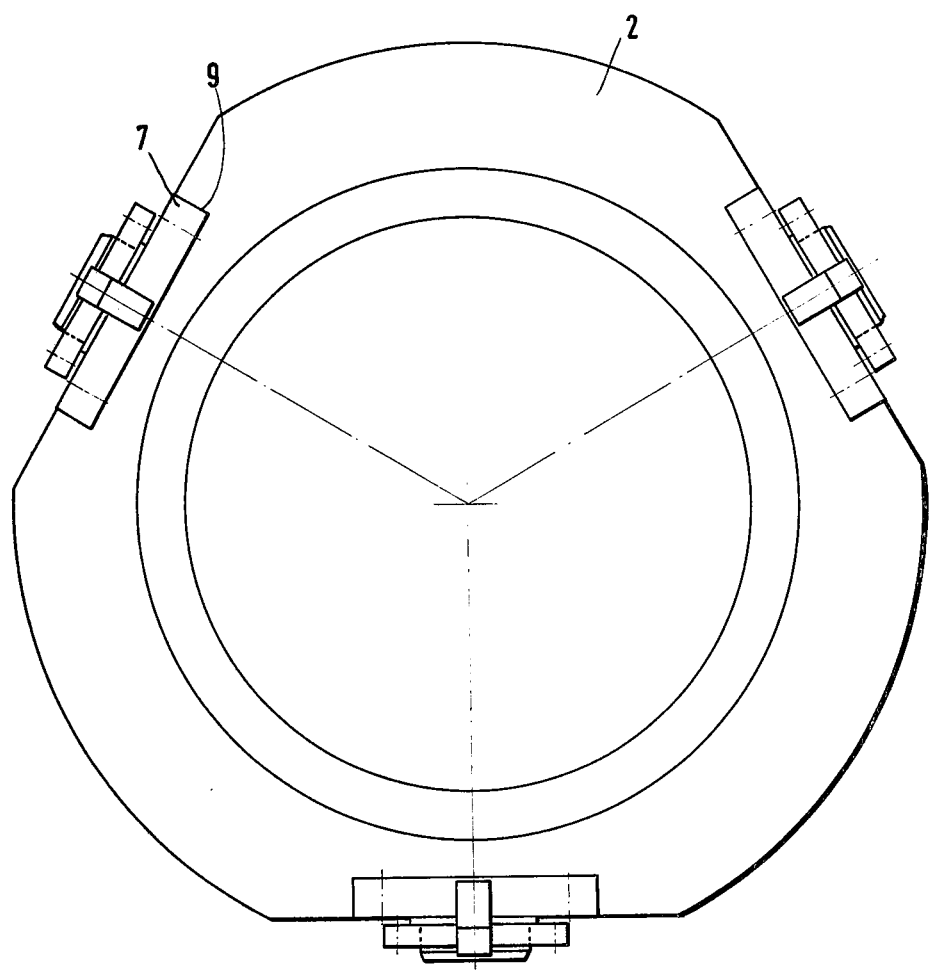
FIG. 3 is a side elevational view partly in section, showing the fitted relationship between the rotating parts and the replaceable overload control parts of the invention.

In FIG. 1, the rotating machine parts are indicated by 1 and 2, connected to one another in the area of projections 3 and 4 by means of the hollow cylindrical carrier links 5. Projections 3 and 4 are parts of plates 6 and 7, respectively, which are connected at 8 to the rotating machine parts 1 and/or 2 by screws which are not shown. Plates 6 and 7 are additionally fixed in axial direction by a wedge joint. As shown in FIG. 3, plates 6 and 7 are fitted into recesses 9 of rotating machine part 1 and/or 2, so that projections 3 and/or 4 with their plates 6 and/or 7 pass along the peripheral forces into these recesses 9.

Plates 6 and/or 7 have, furthermore, yokes 10 attached to them which extend over carrier links 5 preventing the latter from flying off in case of a reduction of initial stress due to overload, just before the shut-off point. As indicated at 11, yokes 10 are screwed to plates 6 and 7. Carrier links 5 themselves are secured against torsion by clamping pins 12, penetrating through carrier links 5 into boreholes 13 of plates 6 and 7. In order to avoid excessive fixation of opposite semi-cylindrical projections 3 and 4, a small gap may be provided between projections 3 and 4 during assembly. This gap has no influence on the functioning of the apparatus.

Plates 6 and 7, with their projections 3 and 4, are easily finished in their dismantled states, and are easily inserted into the rotating machine parts and fixed by means of screws 8. In addition to the screw connection, plates 6 and 7 may be glued into recess 9 of the rotating machine parts. Adhesives are used which are soluble chemically or by heat action.

I claim:

1. Overload apparatus between rotating machine parts comprising
   (a) a pair of joined rotating machine parts;
   (b) a plurality of opposed radially extending projections spaced circumferentially and uniformly around said joined machine parts;
   (c) each said opposed projection being semi-cylindrical to form with the said opposed projection, cylinders;
   (d) the opposed surfaces of each said pair of projections being in a plane transverse to the axis of rotation of the joined parts;
   (e) each pair of opposed projections joined by a hollow cylindrical carrier link;
   (f) each said carrier link comprised of a heavy-duty rigid material embracing said projections under initial stress,
   (g) stripper cams circumferentially spaced around said joined rotating parts between said joined projections; the improvement characterized by
   (h) each of said opposed projections being removably disposed on said joined rotating parts;
   (i) each said semi-cylindrical projection including engaging surfaces arranged at right angles to each other;
   (j) one said engaging surface being longer than said other engaging surface;
   (k) said shorter engaging surface being said opposed engaging surface for said pair of projections;
   (l) base plates on each said semi-cylindrical projection;
   (m) said longer engaging surface being on said base plates;
   (n) recesses in each said pair of joined rotating parts; and
   (o) each said base plate with said longer engaging surface disposed in its respective recess.

2. The apparatus of claim 1, further characterized by
   (a) said base plates fixed in said recesses by detachable machine elements.

3. The apparatus of claim 1, further characterized by
   (a) said base plates fixed in said recesses by gluing.

4. The apparatus of claim 1, further characterized by
   (a) an arresting element on each said projection; and
   (b) each said arresting element extending over said carrier link to hold said carrier link in place.

* * * * *